United States Patent [19]

Sundberg et al.

[11] 4,086,401
[45] Apr. 25, 1978

[54] ELECTRIC STORAGE BATTERY SEPARATOR

[75] Inventors: Erik G. Sundberg, Nol, Sweden; Hans Steig, Soest, Germany

[73] Assignee: Aktiebolaget Tudor, Sundbyberg, Sweden

[21] Appl. No.: 641,756

[22] Filed: Dec. 17, 1975

[51] Int. Cl.² ........................................... H01M 2/14
[52] U.S. Cl. ................................................ 429/145
[58] Field of Search .............. 136/145, 149; 429/145

[56] References Cited

U.S. PATENT DOCUMENTS

| 1,403,577 | 1/1922 | Steerup | 429/145 |
| 2,314,203 | 3/1943 | Fairclough | 136/149 |
| 3,186,877 | 6/1965 | Stanimerovetch | 136/145 |
| 3,340,100 | 9/1967 | Silvestri | 136/145 |
| 3,749,604 | 7/1973 | Langer et al. | 136/145 |
| 3,764,387 | 10/1973 | Stark | 136/145 |

FOREIGN PATENT DOCUMENTS

| 2,506,891 | 8/1975 | Germany | 429/145 |

*Primary Examiner*—John H. Mack
*Assistant Examiner*—H. A. Feeley
*Attorney, Agent, or Firm*—Burns, Doane, Swecker & Mathis

[57] ABSTRACT

Storage battery separators with greater security against short circuit due to pinholes are made by using at least two adjacent microporous sheets, each thinner than those normally used when one alone is present. Sawdust may be added to the composition of one or both of the sheets.

2 Claims, 3 Drawing Figures

ELECTRIC STORAGE BATTERY SEPARATOR

BACKGROUND OF THE INVENTION

The present invention relates to separators for electric storage batteries, where there is risk of bridge formation between the electrodes by non-insulating material. This ordinarily results from formation of dendrites by the electrodes.

In an electric storage battery there are two different kinds of electrodes in each cell, positive and negative. There must not be any electrical contact between these electrodes other than by way of the electrolyte in each cell. However, since in many kinds of electrodes, there is a tendency to dendrite formation, i.e., outgrowths of electrode material from the electrode, the electrodes must be kept separated in some way, so that these dendrites will not bring about direct electrical conductive contact between the electrodes. Such undesirable contact can be prevented, of course, by placing the electrodes far apart. However, there is then very great electrical resistivity in the cells, and the structure is also bulky. It is therefore necessary to solve the problem in some other way. It was decided to use separators. These are porous sheets of various materials such as wood, paper and plastic. In order that the separators may tolerate the milieu of the battery cell, they have to be made either of material with acceptable strength, for instance, polyvinyl chloride, or else suitably treated, e.g., phenolic resin impregnation of paper. Depending upon the way in which the separator is made, there are different pore sizes, and usually the distinction is made between microporous and macroporous separators, the borderline being drawn at an average pore size of about $10\mu$.

Microporous battery separators are known in the art and have been produced in different ways, using various materials to form a self-supporting film or matrix. Representative products and methods for making them are disclosed, for example, in U.S. Pat. Nos. 2,537,631; 2,700,694; 2,772,322; 2,862,988; and 2,913,512.

In the manufacture of such separators, there is always the risk that there will be pinholes in them. By pinholes, we mean holes with a diameter larger than the sought pore size. Pinholes are also characterized in that they establish direct linear connection between the two sides of the separator. Because of the great risk of short circuits from such a hole, all separators have to be closely inspected after manufacture, and separators with pinholes have to be rejected. In spite of close checking in separator manufacture, it may happen that a separator with pinholes will be used in manufacture of a storage battery cell. The risks of short circuit and consequent malfunction or failure of the cell are then very great. Since, however, the separators increase the internal electric resistivity of the cell, the effort is made to produce separators that are as thin as possible. Thin separators offer additional advantages, such as less bulky construction, and the possibility of better utilization of the available space by filling it with active material. However, the thinner the separator, the greater the risk of formation of pinholes, and separators have therefore generally been made with a minimum thickness of 0.5 mm, generally between 0.5 and 1 mm.

Accordingly, a prime object of the present invention is to produce microporous separators with improved security against internal battery short circuit resulting from pinholes as herein defined.

Another object is to provide a separator which permits the use of compositions previously considered undesirable or dangerous because of the risk of pinholes. Still another object is to provide a battery separator affording security against short circuit due to pinholes while exhibiting low electrical resistance.

These and other objects, which will be apparent to those skilled in the art, are achieved in accordance with the present invention.

BRIEF DESCRIPTION OF THE DRAWINGS

In order that the invention may be more readily understood, reference is made to the accompanying drawings in which.

SUMMARY OF THE INVENTION

The separators in accordance with the present invention are characterized in that they comprise at least two porous membranes, each in itself not suitable for use alone as a separator because of unsatisfactory statistical reliability. It has now been discovered that by putting together two membranes, one adjacent to the other, each of which may have one or more pinholes, the risk that a hole in one membrane will coincide with a hole in the other membrane is negligible. Therefore, in the manufacture of the individual membranes, it is possible to tolerate the occurrence of a limited number of pinholes, thereby avoiding expense and production limiting inspection of the finished product, on the one hand, and on the other hand, reducing the thickness of the individual membranes to such an extent that the combined amount of material in a separator made of at least two membranes will be less than what is required if each separator is to consist of only one membrane.

The separators according to the invention offer other advantages. For example, it is known that the presence of wood or sawdust has a favorable effect on the negative electrodes in lead storage batteries. It has previously been known that sawdust can be mixed in those separators that are made by sintering PVC powder, thereby obtaining the desired favorable effect on the negative electrodes. Because of the increased risk of pinholes in the mixing-in of sawdust, it was previously considered that the limits of addition of sawdust would be 5 – 10%. With the present invention, it is now possible to use sawdust up to 50% by volume in the separators, and because of the favorable effects as mentioned above, it is considered that sawdust in the amount of at least 25% by volume would be suitable, in separators that are to be used for lead storage batteries.

In a preferred embodiment, there is combination of a membrane containing the aforementioned large quantity of sawdust, with a membrane without sawdust, to form a separator according to the invention. In the manufacture of storage battery cells, the separators thus prepared are to be so disposed that the sawdust-containing membrane is turned toward the negative electrode.

DETAILED DESCRIPTION OF THE PREFERRED EMBODIMENT

Figure 1:
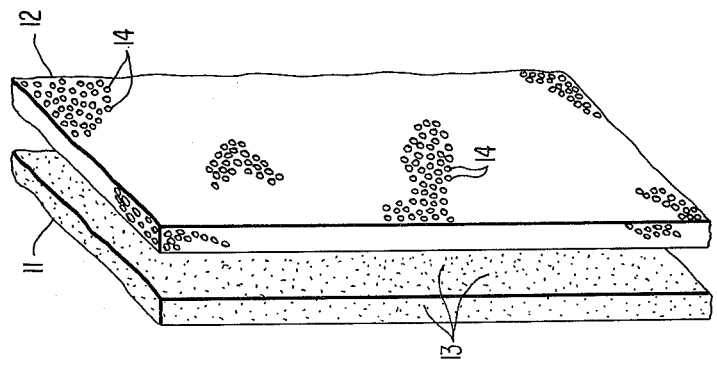
FIG. 1 represents an enlarged isometric view of a preferred embodiment in which at least one microporous separator sheet contains particles of sawdust.

Referring now to FIG. 1, there is seen, in exaggerated thickness, a pair of adjacent microprous separators 1 and 2 of known composition, one of which has embedded in it sawdust particles 3. The separator sheets are each shown to have a plurality of randomly-located pinholes 5 and 6. As already pointed out above, the probabilities that a pinhole 5 in sheet 1 will coincide with a pinhole 6 in sheet 2 are so negligible that a composite separator, constructed as shown in FIG. 1, presents an extremely small risk of internal short circuiting due to dendrite formation and extension through the pinholes. Because of the negligible probabilities that pinholes in the sheets will coincide, the latter may be made far thinner than sheets intended to be used singly as separators.

In actual use in a battery, the two sheets 1 and 2 will be in close contact and will be mounted in the conventional manner in a battery immersed in the electrolyte (not shown), with the sawdust-containing sheet 2 oriented toward the negative electrode (also not shown).

Figure 2:
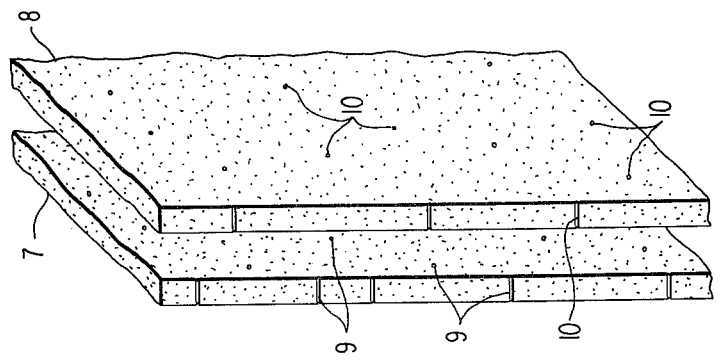
FIG. 2 shows an enlarged isometric view of another embodiment in which the microporous sheets do not contain any sawdust.

In a second embodiment of the present invention, the two sheets constituting the composite separator can be made of the same microporous material. Thus, referring to FIG. 2, there is seen two adjacent microporous sheets 7 and 8, each having randomly-located pinholes 9 and 10. As in the case of the embodiment of FIG. 1, the probabilities that two pinholes in the adjacent sheets will coincide are so negligible that the sheets can be made thinner than those used singly and placed side by side with the security of little likelihood of dendrite formation.

Figure 3:
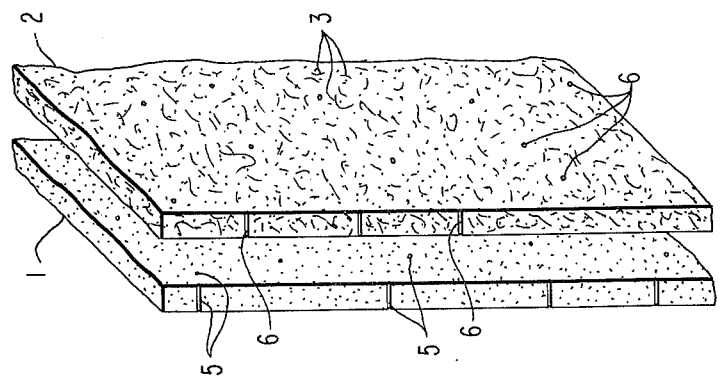
FIG. 3 shows an enlarged isometric view of still another embodiment in which one of the separator sheets is of a macroporous structure.

Another possible and appropriate combination of materials that is made possible by the invention constitutes still another embodiment, as shown in FIG. 3. This embodiment involves the association of a microporous and a macroporous membrane, to constitute a separator.

Referring to FIG. 3, there is seen a microprous separator sheet 11 having micropores 13. Adjacent this sheet is a second separator sheet 12, having macropores 14. As in the previously described embodiments, the sheets are shown exaggerated in size and a distance apart. However, in accordance with the invention, they are made much thinner than usually.

It is known that at least in lead storage batteries, microporous membranes have certain particular advantages. For example, they can prevent or diminish the transfer of antimony from the positive electrode to the negative electrode. However, microporous membranes are more expensive to manufacture than macroporous membranes, and significant advantages can therefore be obtained by combination of a very thin microporous membrane and a very thin macroporous membrane, to form a separator according to the invention.

Although the invention has been described in terms of using two sheets, it will be apparent that it is not so limited. Thus, while two sheets, of course, represent the required minimum, it is possible to use three or more, the number being limited only by how thin the individual sheets can be made, their individual and composite permeability to electrolyte, and their electrical resistance.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and intended to be covered by Letters Patent is:

1. A composite, multi-layer separator effective to minimize formation of dendrites between electrodes of electric storage batteries, said separator comprising at least two thin, contacting, discrete, porous, non-laminated membranes comprising a material having a random distribution of pin holes capable of permitting formation of dendrites if used in a single layer as a separator at least one of said membranes being microporous and having an average pore size less than about 10 microns and said pin holes having a diameter larger than the desired pore size in said membranes, each of said membranes singly being incapable of use as a separator but being capable of such use as a single layer separator in the absence of said pin holes.

2. The composite multi-layer separator of claim 1 wherein the separator is comprised of two microporous membranes each having an average pore size of less than about 10 microns.

* * * * *